United States Patent [19]
Bair et al.

[11] Patent Number: 5,390,769
[45] Date of Patent: Feb. 21, 1995

[54] DRUM BRAKE SPRING CLIP WITH SQUEALER BAND RETAINER

[75] Inventors: John J. Bair, Plainwell, Mich.; Ralph A. Lindgren, Jr., Paradise Valley, Ariz.

[73] Assignee: Eaton Corporation, Cleveland, Ohio

[21] Appl. No.: 130,815

[22] Filed: Nov. 26, 1993

[51] Int. Cl.$^6$ ............................................. F16D 65/10
[52] U.S. Cl. .................................. 188/218 R; 301/6.91
[58] Field of Search ............... 188/218 R, 218 A; 267/160, 161, 162, 163, 164, 165; 301/6.1, 6.91

[56] References Cited

U.S. PATENT DOCUMENTS

| | | | |
|---|---|---|---|
| 1,791,495 | 2/1931 | Frey . | |
| 1,801,712 | 4/1931 | Barrett et al. | 303/6.91 |
| 1,928,079 | 9/1933 | Taylor | 188/218 R |
| 2,049,052 | 7/1936 | Eksergian | 301/6.1 |
| 2,197,583 | 4/1940 | Koeppen et al. | 301/6 |
| 2,349,658 | 5/1944 | Horn | 188/218 |
| 2,489,522 | 11/1949 | Chase | 188/218 |
| 2,588,665 | 3/1952 | Sinclair | 188/218 |
| 2,639,195 | 5/1953 | Bock | 301/6 |
| 2,646,315 | 7/1953 | Richard | 301/6.1 |
| 2,808,910 | 10/1957 | Lyon | 188/218 R |
| 2,962,324 | 11/1960 | Swanberg | 301/6 |
| 3,163,469 | 12/1964 | Huhtala | 301/6 |
| 4,635,882 | 1/1987 | SenGupta et al. | 244/119 |

Primary Examiner—Robert J. Oberleitner
Assistant Examiner—Peter M. Poon
Attorney, Agent, or Firm—Loren H. Uthoff, Jr.; Howard D. Gordon

[57] ABSTRACT

A drum brake spring clip dampener for reducing the level of brake squeal noise where the spring clip dampener includes a leaf spring disposed into a gap formed between a wheel rim and the outer surface of an annular brake drum where the leaf spring is held in position by a holding clip extending from the leaf spring center section over a squealer band to engage the inner face of the squealer band with a hook section where the spring clip dampener introduces a separation force and increased vibration dampening.

3 Claims, 1 Drawing Sheet

DRUM BRAKE SPRING CLIP WITH SQUEALER BAND RETAINER

RELATED APPLICATION

This application is related to application U.S. Ser. No. 08/131,150 filed Oct. 4, 1993 and U.S. Ser. No. 08/131,163 filed Oct. 4, 1993 entitled "Brake Squeal Damper Ring" and "Brake Squeal Spring Clip Dampener" respectively, both assigned to the same assignee, Eaton Corporation, as this application.

FIELD OF THE INVENTION

This invention relates to a device to reduce brake squeal. More specifically, the present invention relates to a device to reduce brake squeal by introducing a dampening force between the wheel and brake drum using a plurality of spring clips to dampen vibration.

BACKGROUND OF THE INVENTION

Brake squeal noise occurs upon application of a vehicle brake when the structure of the brake drum resonates at its natural frequencies due to forces imparted by the brake pad frictionally engaging the inner surface of the brake drum. The sound pressure level produced by the vibrating drum can become quite objectionable to receivers in the immediate area thereby prompting manufacturers of brake drums and other driveline components to modify the brake drums using various means to reduce vibration levels of the drum. Methods commonly used include adding dampening to alter the resonant qualities of the brake drum thereby reducing the amplitude of vibration so as to reduce the sound level produced when brake squeal occurs.

Prior art methods of reducing the vibrational amplitude of a brake drum have included adding various additional structures such as retention bands and/or dampening layers to the outside of the drum with varying degrees of effectiveness. The problem with these prior art approaches generally has been the complexity and expense introduced with the added components where the cost to benefit ratio has not proved to be practical. Another significant problem introduced whenever a layer of material is added to the outside structure of the brake drum is that the rate of heat rejection is dramatically reduced, thereby reducing the service life of the drum due to higher operating temperatures. Examples of these prior art methods can be found by reference to U.S. Pat. Nos. 2,349,658 and 2,639,195, the disclosures of which are hereby incorporated by reference.

SUMMARY OF THE INVENTION

The present invention reduces the amplitude of vibration of the brake drum by providing frictional dampening at the brake drum by inserting a plurality of spring clip dampeners between the vehicle wheel rim and the brake drum adjacent to the squealer band. A separation force is introduced by the spring clip dampeners which react against the inside of the wheel rim and are forced down into or towards the outer surface of the brake drum where the two ends of the spring clip dampener rub against the outside surface of the brake drum thereby providing for frictional dampening. The spring clip dampener is held in place by both an inner and outer tab which engage the inner and outer edge of the squealer band respectively. In this manner, the spring clip dampeners can be easily installed or removed with excellent retention in the desired operational position.

One provision of the present invention is to introduce a degree of frictional dampening at the brake drum squealer band.

Another provision of the present invention is to introduce a degree of frictional dampening at the brake drum utilizing a plurality of spring clip dampeners reacting against the brake drum outer surface and the wheel rim.

Another provision of the present invention is to introduce a separation force and frictional dampening between the vehicle wheel and vehicle brake drum using a plurality of spring clip dampeners preferably in a form of a leaf spring extending from an inner surface on the wheel rim to the brake drum where two ends of the spring dip dampener rub against the outer surface of the brake drum thereby creating frictional dampening.

Another provision of the present invention is to introduce a separation force and frictional dampening between the vehicle wheel and brake drum using a spring clip dampener held in position using a holding clip as part of and extending from the spring clip dampener and engaging the inner face of the squealer band using a hook section thereby holding the spring clip dampener in position.

DETAILED DESCRIPTION OF THE PREFERRED EMBODIMENTS

Figure 1:
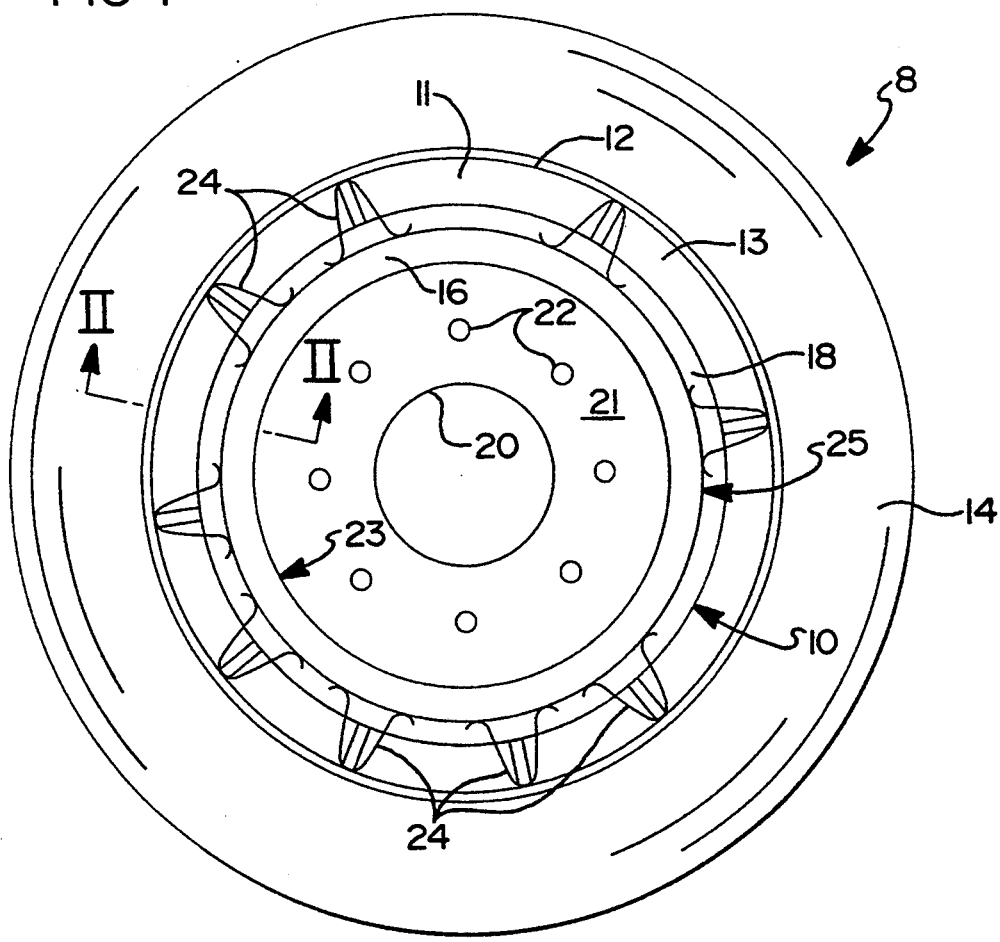
FIG. 1 is a rear elevational view of a vehicle tire mounted on a wheel rim which is in turn mounted to a brake drum, the assembly of which incorporates the spring clip dampener of the present invention.

Now referring to FIG. 1, a vehicle tire 14 is shown mounted to a vehicle wheel 11 which encircles an annular brake drum 10. The brake drum 10 is normally mounted to a vehicle axle (not shown) by way of a plurality of mounting bolts passing through mounting holes 22 and pilots on the axle by way of pilot aperture 20. Wheel rim 12 extends circumferentially about and is radially spaced from the brake drum 10 as is common in wheel assemblies for trucks and other large vehicles. The brake drum 10 is annular in shape having a closed end formed by a flange 21 and an open end opposite the flange 21. The brake drum 10 includes a cylindrical drum section 16 upon which is mounted an annular squealer band 18 and includes a friction inner surface 23 and an outer surface 25 where the flange 21 is mounted to a vehicle axle (not shown) by way of a plurality of mounting holes 22 riding on pilot aperture 20. This construction forms an annular gap 13 between the squealer band 18 and the wheel rim 12. The brake drum 10 has a friction inner surface 23 which is suitably engaged by brake shoes (not shown) in order to apply a braking force to the wheel assembly 8. The brake drum 10 also has an outer surface 25 upon which is formed a squealer band 18 which is an annular ring formed as part of the brake drum 10 and specifically as part of the drum section 16 close to the open end facing the viewer in FIG. 1 and functions to reduce the level of vibration of the brake drum 10 also, in addition to the present invention, lowering the resulting level of brake squeal.

Within the gap 13 are placed a plurality of spring clip dampeners 24 which are made of a spring steel material or any other material that provides a spring-like quality and properly functions as a spring at elevated temperatures encountered in the severe service environment of a vehicle brake. The spring clip dampeners 24 provide a separation force between the wheel rim 12 and the drum section 16 due to their compression upon installation and, in addition to that separation force, provides a significant level of vibration dampening to the drum section 16 which significantly reduces the level of brake squeal noise. The spring clip dampener 24 can be mounted with a variety of spacing between adjacent spring clip dampener 24 in circumferential position along the drum section 16 depending on the vibration mode shapes of the brake drum 10. Ideally, the spring clip dampeners 24 would be positioned at the vibration anti nodes of the drum section 16 when excited at the natural frequency that results in brake squeal. The uninstalled overall height in the spring clip dampener 24 is slightly greater than the height in the gap 13 so that the spring clip dampener is compressed upon installation.

Figure 2:
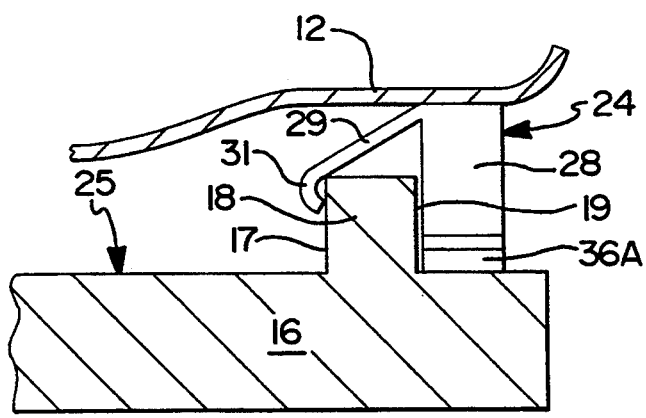
FIG. 2 is a sectional view of the spring clip dampener of the present invention mounted between a wheel rim and a brake drum on the squealer band.

Now referring to FIG. 2, (section II—II of FIG. 1), the spring clip dampener 24 of the present invention is shown fitted in the gap 13 between the wheel rim 12 and the drum section 16. The spring clip dampener 24 is primarily formed by a leaf spring section 28 which is compressed in its height when the spring clip dampener 24 inserted in the gap 13 between the wheel rim 12 and the drum section 16. The spring clip dampener 24 provides a separation force and frictional dampening due to relative movement of the outer surface 25 of the drum section 16 in relation to the wheel rim 12.

The spring clip dampener 24 is held in position by forcing one edge of the leaf spring section 28 against the outer face 19 of the squealer band 18 and using a holding clip 29 having a book section 31 extending from approximately the center of the leaf spring section 28 to engage the inner face 17 of the squealer band 18 with the hook section 31.

Figure 3:
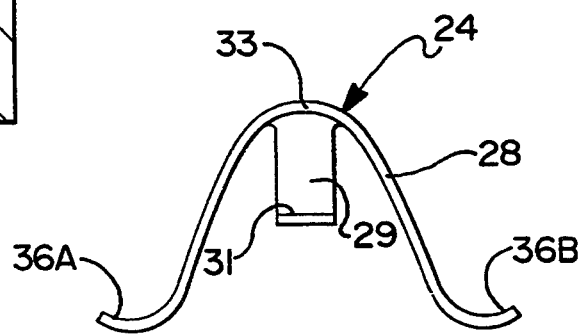
FIG. 3 is a top view of the spring clip dampener of the present invention.

Now referring to FIG. 3, a front elevational view of one of the spring clip dampeners 24 of the present invention and is shown in the same orientation as that shown in FIG. 1 but in its free, uninstalled condition. The dimensional height, when not installed, of the leaf spring section 28 from the bottom of the curved first and second ends 36A and 36B respectively, up to the center portion 33 of the leaf spring section 28 is greater than the distance from the outer surface 25 of the drum 16 to the wheel rim 12. The curved first and second ends 36A and 36B are clearly shown where the purpose of the radius in the ends is to facilitate installation and provide a proper surface for frictional damping by relative motion between the spring clip dampener 24 and the drum 16. Thus, upon insertion into the gap 13, the leaf spring section 28 is compressed and exerts a separation force upon release between the outer surface 25 and the wheel rim 12.

The spring clip dampener 24 is held in position with a holding clip 29 which is attached to the leaf spring section 28 at the center portion 33 and extends to engage the squealer band 18 at its inside face 17. The holding clip 29 has a hook section 31 which contacts the inside face 17 while one edge of the leaf spring section 28 contacts the outer face 19 of the squealer band 18.

The holding clip 29 can be formed as part of the leaf spring section 28 or it can be attached after forming of the leaf spring section 28 by welding or using other bonding methods. The spring clip dampener 24 is preferably made of one of the commercially available spring steel material that retains its properties at the high temperatures experienced in heavy duty brake operation.

A plurality of spring clip dampeners of the present invention circumferentially positioned between the wheel rim and the brake squealer band reduces the brake squeal noise in the wheel/drum assembly by increasing vibration dampening. The spring clip dampener of the present invention may be readily installed and removed without special tools and may be readily positioned as desired along the circumference of the squealer band. In addition to dampening brake noise, the spring clip dampener utilized in the assembly will allow road deflection of the wheel rim with respect to the drum.

Although this invention has been described in its preferred form with a certain degree of particularity, it is understood that the present disclosure of the preferred form has been made only by way of example only in that numerous changes in the details and construction and combination and arrangement of parts may be resorted to without departing from the spirit and the scope of the invention as here and now claimed.

We claim:

1. A drum brake assembly with reduced brake squeal noise comprising:
   an annular brake drum having an axis of rotation and having a drum outer surface and an annular squealer band mounted to said drum outer surface, said squealer band having an inner face and an outer face, said brake drum having a flange end and an open end opposite to said flange end where said squealer band is mounted substantially toward said open end;
   a wheel comprised of an annular wheel rim radially spaced from said brake drum forming a gap between said drum outer surface and said wheel rim and having a hub section mounted to said flange, said wheel rim attached to said hub section;
   a spring clip dampener mounted between said wheel rim and said drum outer surface between said squealer band and said open end adjacent to said squealer band outer face, said spring clip dampener comprised of a leaf spring section, said leaf spring section having a first end contacting said drum outer surface, a center section contacting said wheel rim, and a second end contacting said drum outer surface, a holding clip attached to said leaf spring section angularly extending from said center section inward across said squealer band overlapping and contacting said inner face of said squealer band where said spring clip dampener creates a separation force between said brake drum and said wheel rim to increase the level of vibration dampening on said brake drum thereby lowering brake squeal noise level.

2. The drum brake assembly of claim 1, wherein said first end has a radius of curvature therein and said second end has a radius of curvature therein and where said center section has a radius of curvature therein in opposite direction to the radius of curvature in said first and second ends of said leaf spring.

3. The drum brake assembly of claim 1, wherein said holding clip has a hook section having a relatively small radius of curvature formed at an end of said holding clip that engages said inner face of said squealer band.

* * * * *